(12) United States Patent
Eaton et al.

(10) Patent No.: US 11,396,389 B2
(45) Date of Patent: Jul. 26, 2022

(54) PAYLOAD ADAPTER HAVING A TRUSS SUPPORT STRUCTURE

(71) Applicant: The Boeing Company, Chicago, IL (US)

(72) Inventors: Bailey Keakulina Eaton, Seattle, WA (US); Craig Patrick McGarth, Seattle, WA (US); Dana M LaFavour, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 155 days.

(21) Appl. No.: 16/678,424

(22) Filed: Nov. 8, 2019

(65) Prior Publication Data

US 2021/0139169 A1    May 13, 2021

(51) Int. Cl.
B64G 1/64    (2006.01)

(52) U.S. Cl.
CPC ........ B64G 1/641 (2013.01); *B64G 2001/643* (2013.01)

(58) Field of Classification Search
CPC .. B64G 1/641; B64G 2001/643; B64G 1/645; B64G 2001/1092; B64G 1/10; F16B 11/008
See application file for complete search history.

(56) References Cited

U.S. PATENT DOCUMENTS

| | | | | |
|---|---|---|---|---|
| 5,605,308 A * | 2/1997 | Quan | ..................... | B64G 1/641 102/489 |
| 5,613,653 A * | 3/1997 | Bombled | ............... | B64G 1/641 244/173.1 |
| 5,816,539 A * | 10/1998 | Chan | ..................... | B64G 1/007 244/159.4 |
| 5,898,123 A * | 4/1999 | Fritz | ..................... | F42B 15/38 102/378 |
| 8,393,582 B1 * | 3/2013 | Kutter | .................... | B64G 1/402 244/172.3 |
| 9,796,488 B2 * | 10/2017 | Cook | .................... | B64G 1/641 |
| 9,994,336 B1 | 6/2018 | Ghassemieh et al. | | |
| 10,011,373 B1 * | 7/2018 | Echelman | ............ | F16B 7/0406 |
| 10,351,268 B2 * | 7/2019 | Estevez | ................ | B64G 1/1085 |
| 2002/0000495 A1 | 1/2002 | Diverde et al. | | |
| 2008/0078886 A1 | 4/2008 | Foster et al. | | |
| 2013/0221163 A1 * | 8/2013 | Barber | ................... | B64G 1/641 244/173.1 |
| 2014/0131521 A1 * | 5/2014 | Apland | .................. | B64G 1/641 244/173.3 |

(Continued)

OTHER PUBLICATIONS

United States Patent and Trademark Office Non-Final Office Action for U.S. Appl. No. 16/678,390, dated Mar. 17, 2022, pp. 1-23.

*Primary Examiner* — Medhat Badawi
*Assistant Examiner* — Vicente Rodriguez
(74) *Attorney, Agent, or Firm* — Vivacqua Crane, PLLC

(57) ABSTRACT

A payload adapter configured to removably attach to one or more payload bridges. The payload adapter includes a forward open end defined by a forward ring, an aft open end defined by an aft ring, a plurality of truss supports connecting the forward ring and the aft ring to one another, and a plurality of mounting fixtures disposed around a circumference the payload adapter. The mounting fixtures are each configured to releasably attach to a secondary payload bridge.

20 Claims, 11 Drawing Sheets

(56) References Cited

U.S. PATENT DOCUMENTS

2016/0304222 A1    10/2016  Fernandez et al.
2016/0368625 A1*  12/2016  Field ...................... B64G 1/641
2017/0225808 A1     8/2017  Echelman et al.
2017/0327252 A1    11/2017  Lim et al.
2018/0055227 A1*   3/2018  Jones ....................... B64G 1/22

* cited by examiner

PAYLOAD ADAPTER HAVING A TRUSS SUPPORT STRUCTURE

INTRODUCTION

The present disclosure relates to payload adapters for spacecraft. More particularly, the present disclosure relates to a payload adapter having a plurality of truss supports and a plurality of mounting fixtures that are each configured to releasably attach to a secondary payload adapter.

BACKGROUND

A launch vehicle carries one or more payloads from the surface of the Earth into space. For example, the launch vehicle may carry a primary payload and several smaller secondary payloads. A payload adapter is used to independently support the primary payload and the secondary payloads. One type of payload adapter forms an annular ring-shaped profile, where secondary payload ports are disposed around a circumference of the payload adapter. After launch, the primary payload is separated from the launch vehicle. In some instances, after the primary payload separates the payload adapter then separates from the launch vehicle. The secondary payloads may be hosted on the payload adapter for the duration of their mission life or, alternatively, the secondary payloads may be deployed from the payload adapter into a specific orbital state.

A payload adapter includes secondary payload ports that are each used to secure a secondary payload. However, the location of the secondary payload ports are static and may not be modified once the payload adapter is fabricated. For example, one type of payload adapter includes a monocoque structure having an external skin, which is referred to as a shell. The secondary payload ports in the form of apertures that extend through the shell of the payload adapter. As a result, the specific location of the secondary payload ports of the payload adapter are fixed and may not change once they are formed within the shell of the payload adapter. This also means that the location of the secondary ports of the payload adapter are fixed and may not change once they are formed within the shell of the payload adapter. In order to fit within a pre-allocated angular space within the launch vehicle's fairing, secondary payloads follow a standard or predefined volumetric constraint. However, the geometry of the secondary payload often changes over time during the design process.

The launch vehicle should be balanced to ensure controllability during launch. However, if the secondary payloads are not of equal mass or are attached to the payload adapter in a non-symmetrical manner, then the launch stack center of mass may exceed from the controllable offset limit. As a result, ballast may be required to provide balance. However, introducing ballast reduces the amount of useable payload mass that the launch vehicle may carry. Also, introducing ballast may also reduce the targetable orbit energy, which is also referred to as delta-v, if another payload mass is held constant.

SUMMARY

According to several aspects, a payload adapter configured to removably attach to one or more payload bridges is disclosed. The payload adapter includes a forward open end defined by a forward ring, an aft open end defined by an aft ring, a plurality of truss supports connecting the forward ring and the aft ring to one another, and a plurality of mounting fixtures disposed around a circumference the payload adapter. The mounting fixtures are each configured to releasably attach to a secondary payload bridge.

In another aspect, a payload adapter includes a forward open end defined by a forward ring, an aft open end defined by an aft ring, a plurality of truss supports connecting the forward ring and the aft ring to one another, and a plurality of mounting fixtures disposed around a circumference the payload adapter. The payload adapter also includes a secondary payload bridge having a body portion and a plurality of attachment points connected to the body portion of the secondary payload bridge. The plurality of mounting fixtures are each configured to releasably attach to one of the plurality of attachment points of the secondary payload bridges. The secondary payload bridge also includes a secondary payload port that is connected to the body portion, where the secondary payload port is configured to releasably attach to a corresponding secondary payload.

In still another aspect, a method of constructing a payload adapter is disclosed. The method includes connecting a forward open end defined by a forward ring to an aft open end defined by an aft ring by a plurality of truss supports. The method also includes placing a plurality of mounting fixtures around a circumference the payload adapter, where the plurality of mounting fixtures are each configured to releasably attach to a secondary payload bridge.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a payload adapter having a plurality of truss supports and a plurality of mounting fixtures that are each configured to releasably attach to a secondary payload adapter. The plurality of receiving features are each configured to releasably attach to a secondary payload bridge. Accordingly, the position of the secondary payloads around the circumference of the payload adapter may be adjusted on an ongoing basis.

The following description is merely exemplary in nature and is not intended to limit the present disclosure, application, or uses.

Figure 1:
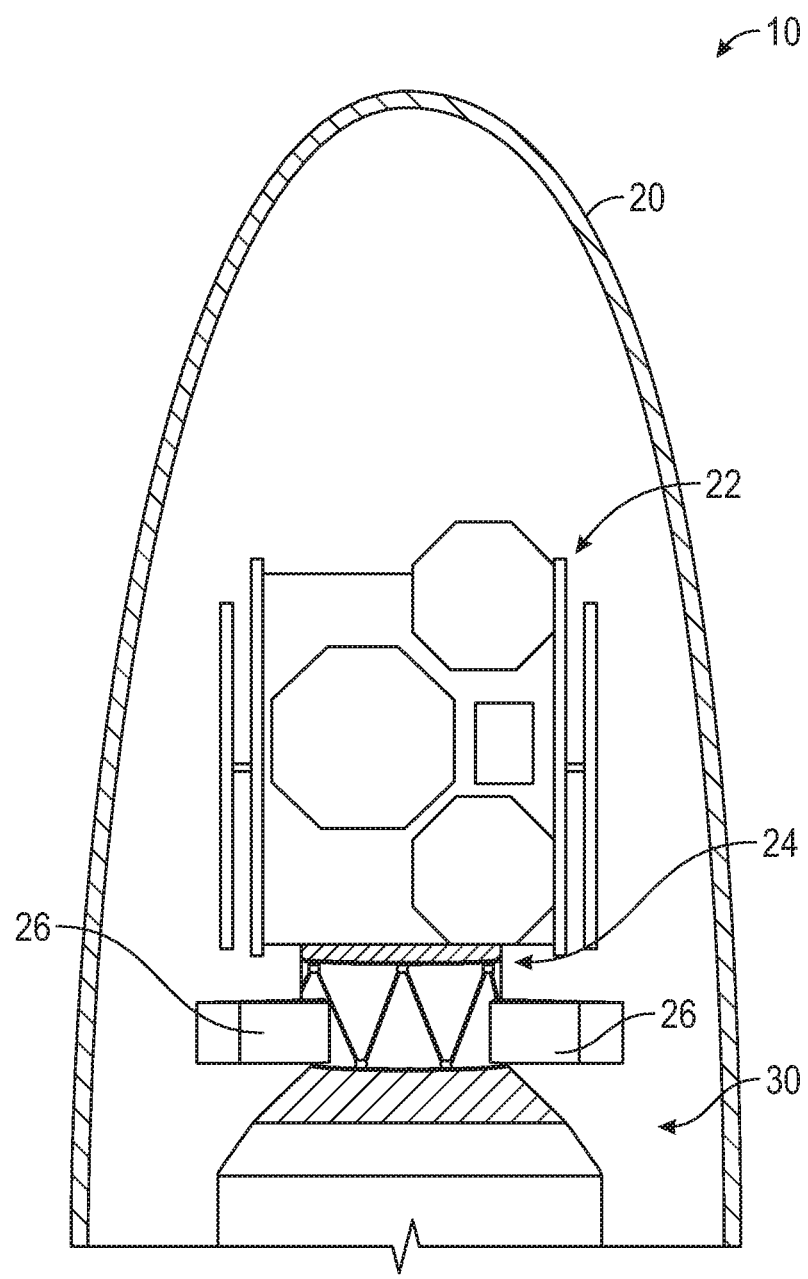
FIG. 1 is a cross-sectioned view of a forward end of a launch vehicle including a fairing, a primary payload, a payload adapter, and a plurality of secondary payloads, according to an exemplary embodiment.

Referring to FIG. 1, a portion of an exemplary launch vehicle 10 is shown. The launch vehicle 10 includes a payload fairing 20, a primary payload 22, a payload adapter 24, a plurality of secondary payloads 26, and a launch adapter 30. The primary payload 22, the payload adapter 24, the plurality of secondary payloads 26, and the launch adapter 30 are housed within the payload fairing 20. The launch vehicle 10 carries the primary payload 22 and the plurality of secondary payloads 26 from the Earth's surface and into space. In one example, the primary payload 22 is a satellite that is configured to orbit Earth. The primary payload 22 is supported by the payload adapter 24. The secondary payloads 26 are mounted to the payload adapter 24 in a location below the primary payload 22. The payload adapter 24 is seated upon the launch adapter 30.

Figure 2:
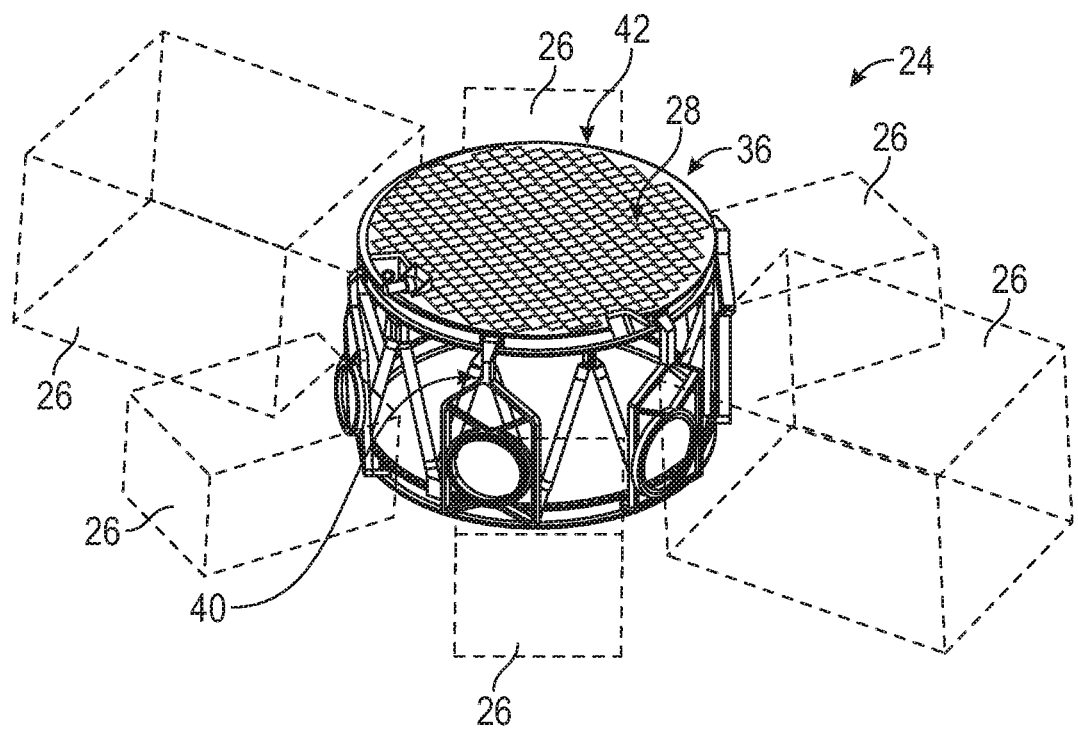
FIG. 2 is a perspective view of the payload adapter having a plurality of secondary payloads mounted thereon, according to an exemplary embodiment.
Figure 3:
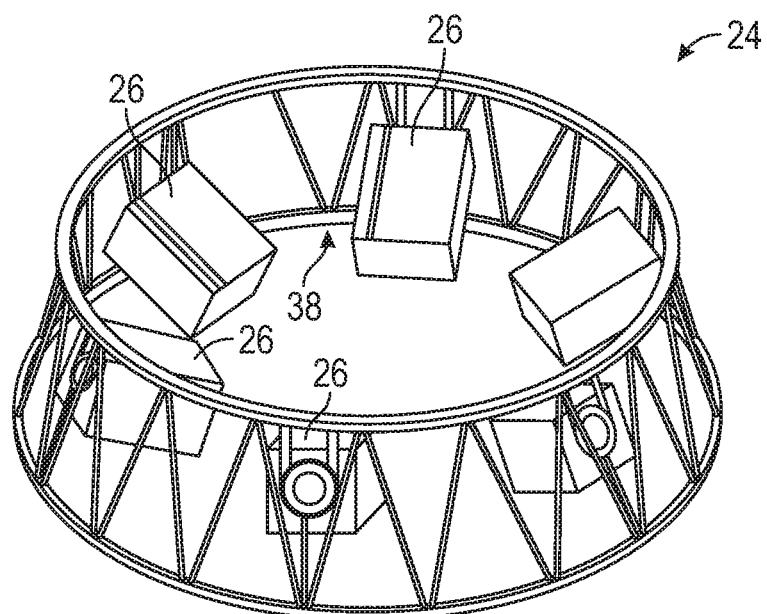
FIG. 3 is a perspective view of an alternative embodiment of the payload adapter, where the secondary payloads are located within the payload adapter's circumference, according to an exemplary embodiment.

FIG. 2 is a perspective view of the payload adapter 24, the plurality of secondary payloads 26, and a solar panel array 28 disposed at a forward open end 42 of the payload adapter 24. In the non-limiting embodiment as shown, six secondary payloads 26 of unequal size and mass are radially mounted to the payload adapter 24, however, it is to be appreciated that FIG. 2 is merely exemplary in nature and that any number and composition of secondary payloads 26 may be mounted to the payload adapter 24. Although FIG. 2 illustrates the secondary payloads 26 spaced equidistantly apart, the location of the secondary payloads 26 may be adjusted as explained below. Referring to both FIGS. 1 and 2, in an embodiment the secondary payloads 26 are each arranged radially around an outermost side 36 of the payload adapter 24. However, in the alternative embodiment as shown in FIG. 3, the secondary payloads 26 are arranged around an innermost side 38 of the payload adapter 24.

Figure 4:
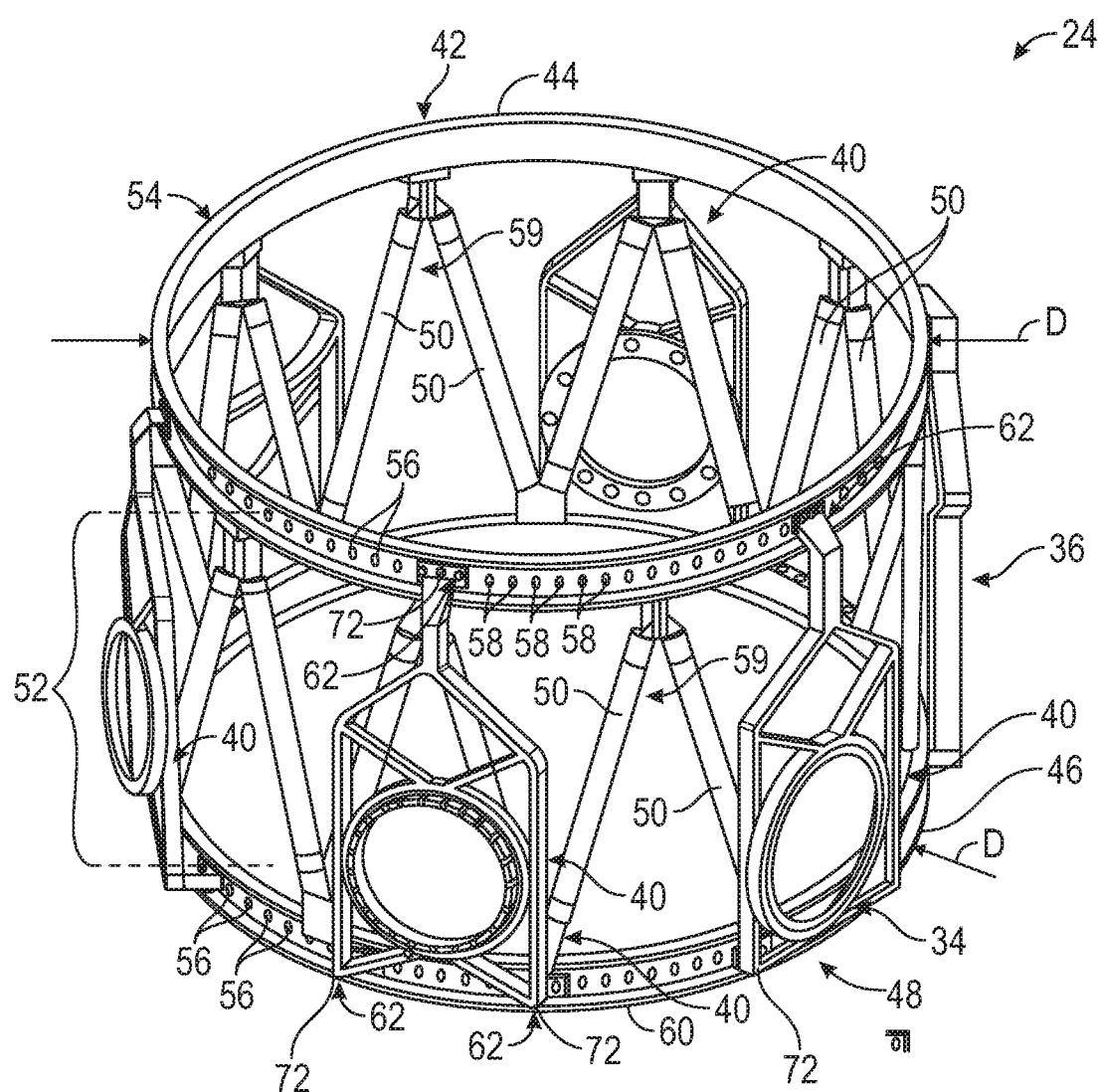
FIG. 4 is a perspective view of the payload adapter and the secondary payload bridges, according to an exemplary embodiment.

Each secondary payload 26 is mounted to the payload adapter 24 by a corresponding secondary payload bridge 40, which is shown in FIG. 4. Referring now to FIG. 4, the secondary payload bridges 40 are removably attached to a main body 34 of the payload adapter 24. In the embodiment as shown in the figures, the payload adapter 24 is a ring adapter. Accordingly, the payload adapter 24 has an annular profile defining a circumference 54. The secondary payload bridges 40 are disposed around the innermost side 38, the outermost side 36 (FIG. 2) or both the innermost side 38 and the outermost side 36 of the payload adapter 24.

The payload adapter 24 includes a forward open end 42 defined by a forward ring 44, an aft open end 46 defined by an aft ring 48, and a side structure 52 connecting the forward ring 44 to the aft ring 48. In the embodiment as shown in FIG. 4 the side structure 52 is a plurality of truss supports 50 connecting the forward ring 44 and the aft ring 48 to one another. In an embodiment, the truss supports 50 are constructed of a carbon fiber reinforced polymer composite material. However, in another embodiment, the truss supports 50 are constructed of a structural material such as, for example, aluminum. The forward ring 44 is configured to either directly or indirectly couple to the payload adapter 24 to the primary payload 22 (FIG. 1), and the aft ring 48 is configured to either directly or indirectly couple the payload adapter 24 to the launch adapter 30 (FIG. 1). In an embodiment, the forward ring 44 and the aft ring 48 are constructed of a structural material such as, for example, stainless steel or aluminum.

Figure 10:
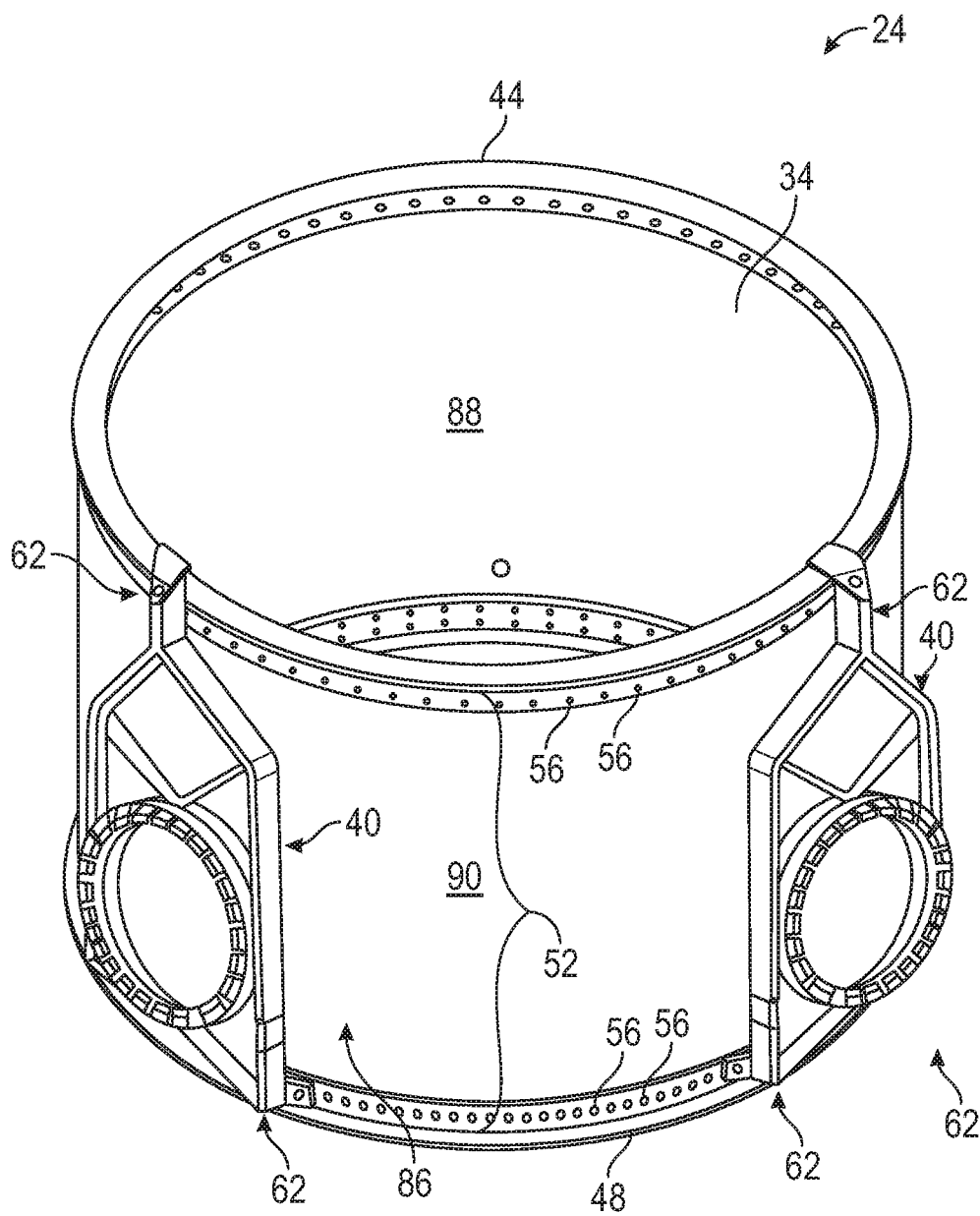
FIG. 10 is an illustration of the payload adapter having a monocoque structure, according to an exemplary embodiment.

In the embodiment as shown in FIG. 4, the payload adapter 24 is a truss style payload adapter. That is, the plurality of truss supports 50 are configured to bear the loads exerted upon the payload adapter 24. In the embodiment as shown in the figures, the plurality of truss supports 50 are oriented at consistent angles to form alternately inverted isosceles triangle-shaped openings 59 around the circumference 54 of the payload adapter 24. This orientation may be referred to as a Warren truss arrangement. However, it is to be appreciated that other truss arrangements may be used as well. It is also to be appreciated that the side structure 52 is not limited to the truss supports 50. For example, in the embodiment as shown in FIG. 10, the secondary payload bridges 40 are removably attached to a monocoque structure, and the side structure 52 is a shell 86.

Referring back to FIG. 4, a plurality of mounting fixtures 56 are disposed around the circumference 54 payload adapter 24. The mounting fixtures 56 are each configured to releasably attach to the plurality of attachment points 62 of one of the secondary payload bridges 40. For example, in the embodiment as shown in FIG. 4, the mounting fixtures 56 are a plurality of bolt holes 58 that are disposed around the forward ring 44 and a plurality of bolt holes 60 disposed around the aft ring 48. Although FIG. 4 illustrates the mounting fixtures 56 disposed around the outermost side 36 of the payload adapter 24, in an alternative embodiment the mounting fixtures 56 are disposed around the innermost side 38 (FIG. 3) of the payload adapter 24.

Figure 5:
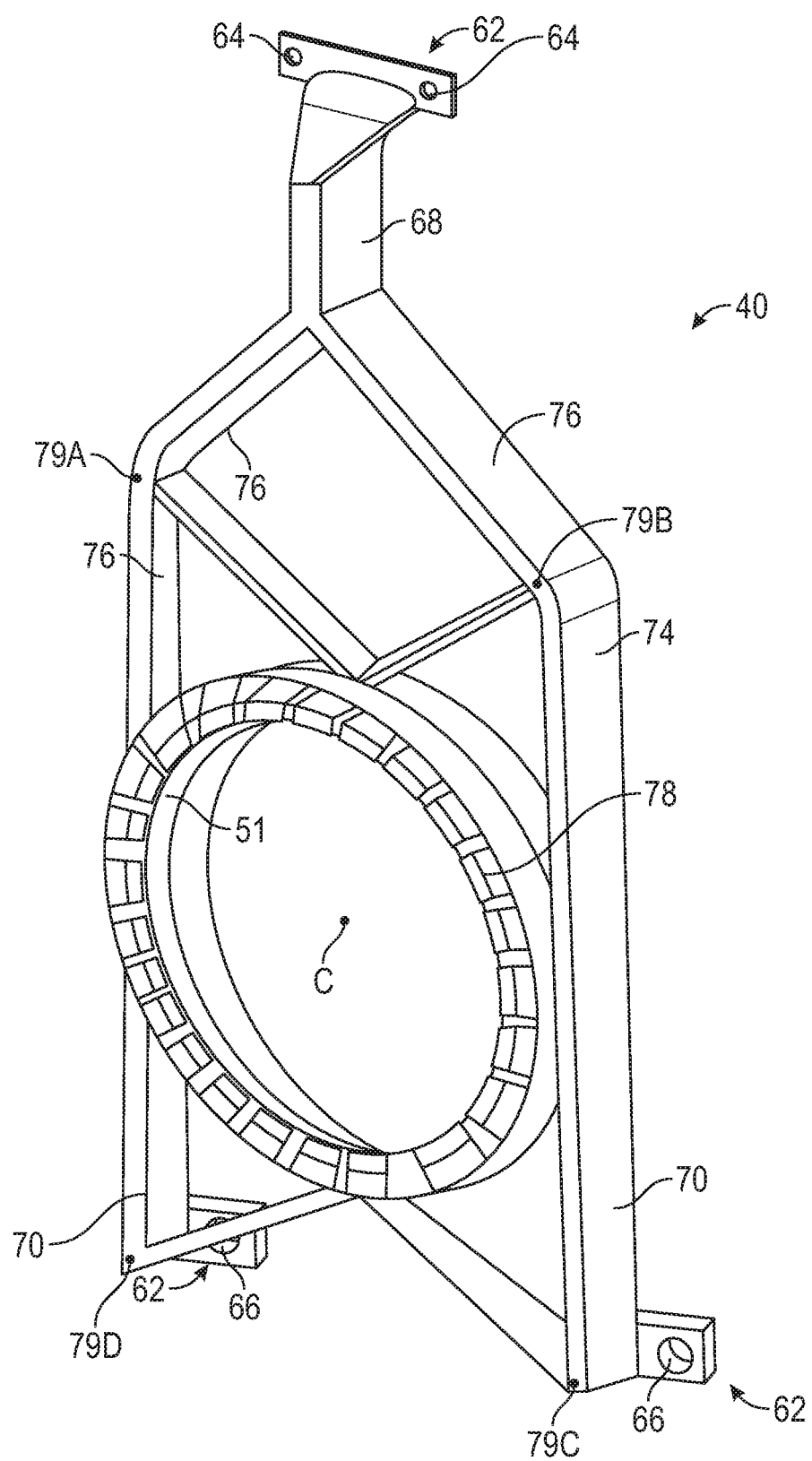
FIG. 5 illustrates one of the secondary payload bridges shown in FIG. 4, according to an exemplary embodiment.

Similarly, each secondary payload bridge 40 is removably attached to the payload adapter 24 by a plurality of attachment points 62. For example, in the embodiment as shown in FIG. 5, the plurality of attachment points 62 include one or more bolt holes 64 located on an upper arm 68 and one or more bolt holes 66 located on each lower arm 70 of the secondary payload bridge 40. The secondary payload bridges 40 are disposed along either the outermost side 36 (FIG. 2) or the innermost side 38 (FIG. 3) of the payload adapter 24. Although removable attachment is described, it is to be appreciated that in one embodiment after attachment the secondary payload bridge 40 may then be permanently attach to the payload adapter 24.

Referring back to FIG. 4, a plurality of corresponding fasteners 72 are used to secure the secondary payload bridge 40 to the payload adapter 24. Therefore, the secondary payload bridge 40 is released from the payload adapter 24 by removing the corresponding fasteners 72 from the respective bolt holes 58, 64, and 66. Although FIG. 4 illustrates fasteners 72 such as bolts, it is to be appreciated that FIG. 4 is merely exemplary in nature, and any other device for releasably attaching the secondary payload bridges 40 to the payload adapter 24 may be used as well. For example, in another embodiment, the secondary payload bridges 40 are secured to the payload adapter 24 by clamping, drilling on assembly, or by slots.

FIG. 5 is perspective view of one of the secondary payload bridges 40 shown in FIG. 5. The secondary payload bridge 40 includes a body portion 74, where the plurality of attachment points 62 are connected to the body portion 74. The secondary payload bridge 40 also includes a secondary payload port 78 that is connected to the body portion 74, where the secondary payload port 78 is configured to releasably attach to a corresponding secondary payload 26 (FIGS. 1 and 2). In the non-limiting embodiment as shown, the secondary payload port 78 includes a round profile 51, where the secondary payload 26 is mounted radially to the secondary payload port 78, however it is to be appreciated that other types of profiles may be used as well.

Figure 6A:
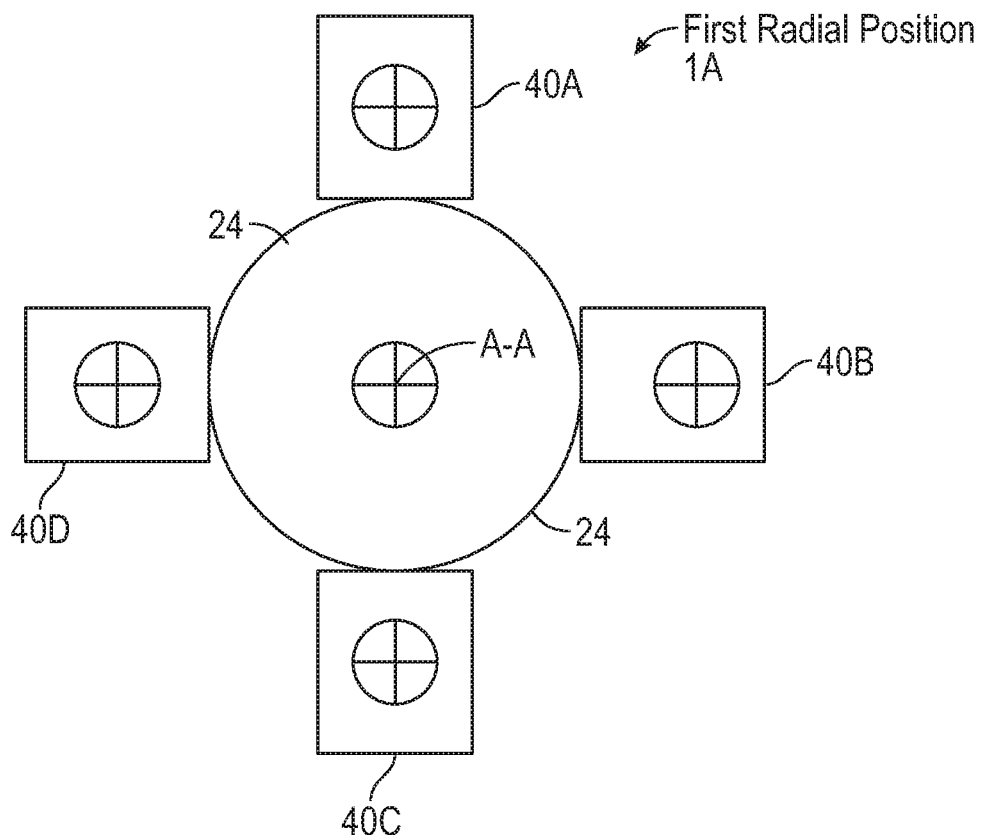
FIG. 6A is a schematic diagram of the payload adapter and four secondary payload bridges arranged equidistant from one another, according to an exemplary embodiment.
Figure 6B:
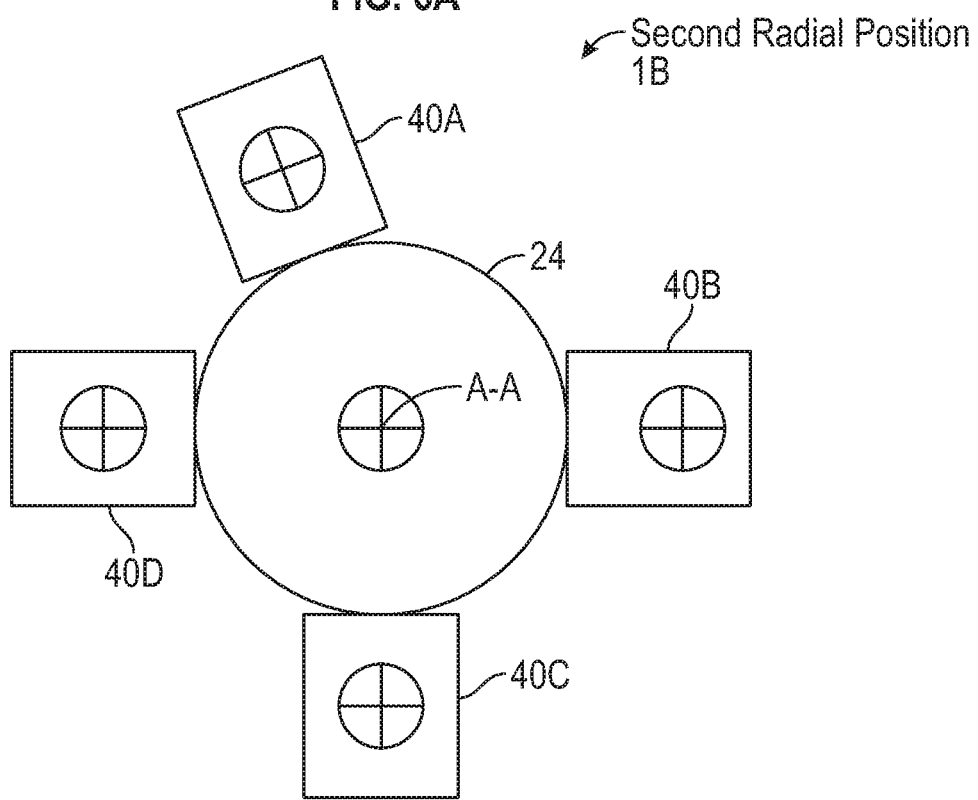
FIG. 6B is an illustration of the payload adapter shown in FIG. 6A, where one of the secondary payload bridges have been moved in a counterclockwise direction, according to an exemplary embodiment.

The secondary payload bridges 40 may be removed from the payload adapter 24 and then reattached in a different location of the payload adapter 24 by the fasteners 72. For example, FIG. 6A is a schematic diagram illustrating four secondary payload bridges 40A, 40B, 40C, 40D spaced equally, and the secondary payload bridge 40A is in a first angular position 1A. Turning now to FIG. 6B, the top secondary payload bridge 40A has been moved counter-clockwise to the left, and into a second angular position 1B. Accordingly, it is to be appreciated that the secondary payload bridges 40 are clockable about a rotational axis A-A of the payload adapter 24. In other words, an angular position of each secondary payload bridge 40 about the rotational axis A-A of the payload adapter 24 is adjustable. Therefore, each secondary payload bridge 40 may be located in various respective angular positions about the rotational axis A-A of the payload adapter 24. It follows that the position of each secondary payload 26 (FIGS. 1 and 2) may also be shifted in various respective angular positions about the rotational axis A-A of the payload adapter 24. Thus, the plurality of attachment points 62 (FIG. 4) of the secondary payload bridges 40 and the plurality of mounting fixtures 56 disposed around the circumference 54 (FIG. 4) of the payload adapter 24 allow for clockable or selective angular rotational positioning of a corresponding secondary payload bridge 40 about to the longitudinal axis A-A of the payload adapter 24.

Referring to FIGS. 4 and 5, in an embodiment the body portion 74 of the secondary payload bridge 40 is constructed of a structural material such as aluminum. In an exemplary embodiment, the body portion 74 of the secondary payload bridge 40 is constructed of at least one of the following materials: aluminum, titanium, steel, and a composite material. In the embodiment as shown in FIG. 4, the body portion 74 of the secondary payload bridge 40 is composed of a plurality of trusses 76. For example, FIG. 4 illustrates the plurality of trusses 76 arranged in a four-point bridge to support the secondary payload port 78. That is, the trusses 76 are arranged so as to define four corners or points 79A, 79B, 79C, 79D arranged in a square or rectangular pattern A vertically oriented truss 76 connects points 79A and 79D to one another and another vertically oriented truss 76 connects points 79B to 79C to one another.

Figure 7:
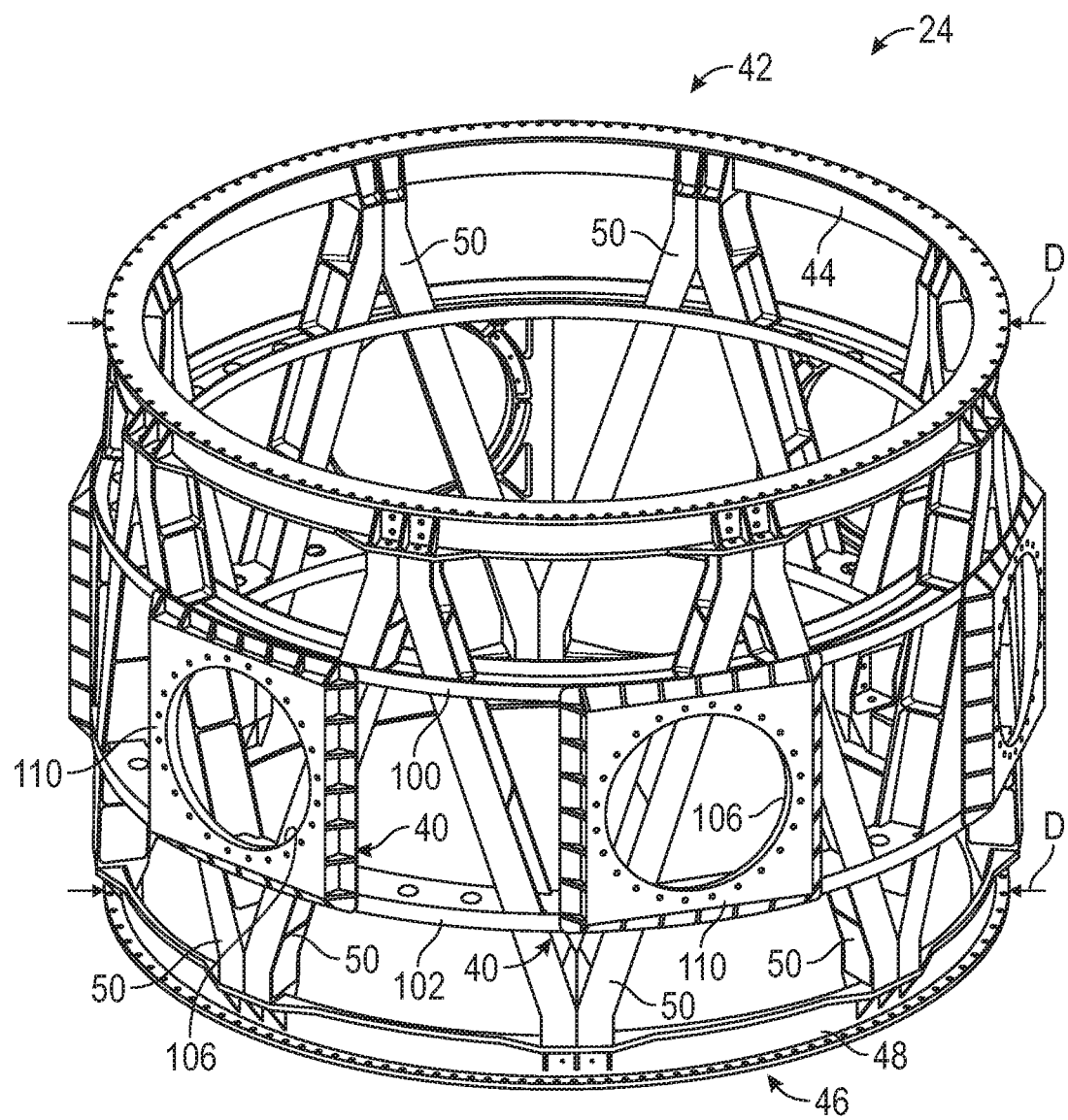
FIG. 7 is an alternative embodiment of the payload adapter and the secondary payload bridges, according to an exemplary embodiment.

Although FIG. 4 illustrates the mounting fixtures 56 disposed around the forward ring 44 and the aft ring 48, it is to be appreciated that this embodiment is merely exemplary in nature, and the mounting fixtures 56 are not limited to the forward and aft rings 44, 48. For example, in the embodiment as shown in FIG. 7, the payload adapter 24 includes an upper ring 100 and a lower ring 102 that are both disposed between the forward ring 44 and the aft ring 48. Specifically, the upper ring 100 is disposed between the forward ring 44 and the lower ring 102, and the lower ring 102 is disposed between the upper ring 100 and the aft ring 48. The upper ring 100 and the lower ring 102 are both attached to the truss supports 50 of the payload adapter 24. The plurality of mounting fixtures 56 (not visible in FIG. 7) are disposed around both the upper ring 100 and the lower ring 102. The plurality of mounting fixtures 56 are configured to releasably attach to one of the plurality of attachment points 62 of the secondary payload bridge 40 (also not visible in FIG. 7). Similar to the embodiment as shown in FIG. 4, the mounting fixtures 56 any device for releasably attaching the secondary payload bridges 40 to the payload adapter 24 such as, for example, bolts.

FIG. 7 also illustrates the secondary payload bridges 40 constructed of a wall structure 110 instead of the plurality of trusses 76 shown in FIG. 4. In the exemplary embodiment as shown, the secondary payload port 78 is an aperture 106 that extends through the wall structure 110 of the corresponding secondary payload bridge 40.

Figure 8:
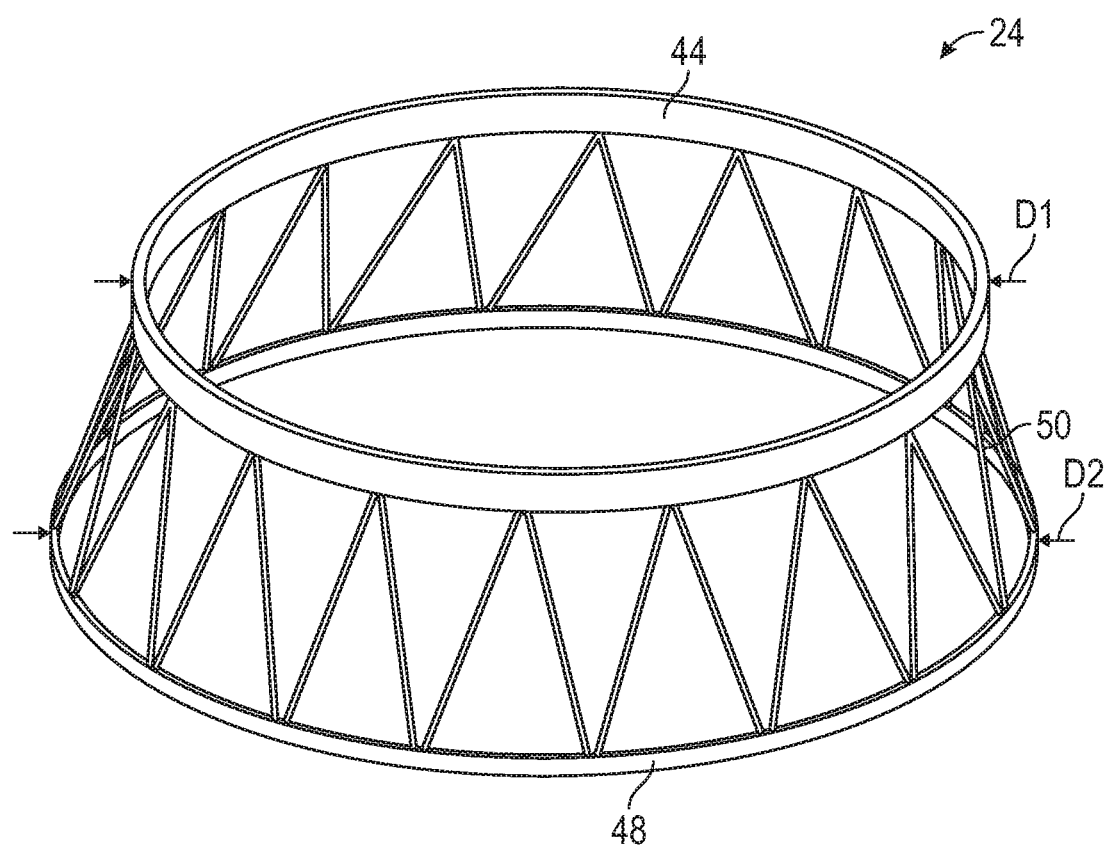
FIG. 8 is an alternative embodiment of the payload adapter having a forward ring that has a smaller diameter than an aft ring, according to an exemplary embodiment.

FIGS. 4 and 7 illustrate the forward ring 44 and the aft ring 48 having identical diameters D. That is, the forward ring 44 and the aft ring 48 are identical in size. However, in the alternative embodiment as shown in FIG. 8, the forward ring 44 and the aft ring 48 both have unequal diameters. Specifically, in the non-limiting embodiment as shown in FIG. 8, the forward ring 44 includes a forward diameter D1 and the aft ring 48 includes an aft diameter D2, where the forward diameter D1 is less than the aft diameter D2. However, it is to be appreciated that in another embodiment the forward diameter D1 is greater than the aft diameter D2. The forward diameter D1 of the forward ring 44 and the aft diameter D2 of the aft ring 48 are determined based on the specific packaging requirements of the launch vehicle 10 (FIG. 1).

Figure 9:
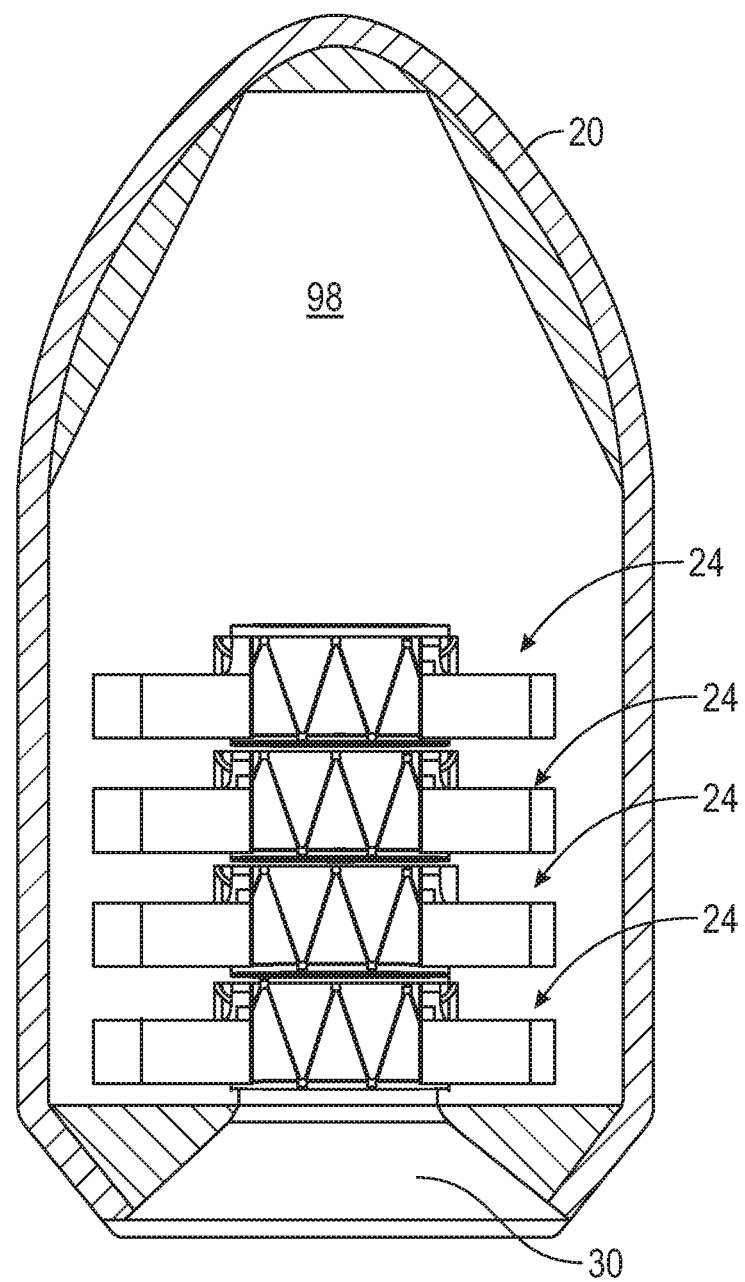
FIG. 9 illustrates the payload fairing where a plurality of the payload adapters are stack on top of one another, according to an exemplary embodiment.

FIG. 9 is an exemplary embodiment of the payload fairing 20 and a plurality of payload adapters 24 that are located within the payload fairing 20. In the example as shown, four separate payload adapters 24 are stacked on top of one another. It is to be appreciated that the plurality of truss supports 50 (shown in FIG. 4) of the payload adapter 24 result in reduced mass and increased strength when compared to some other types of conventional payload adapters presently available. For example, it may only be possible to stack two or three conventional payload adapters on top of one another because of their limited strength and heavy mass. In contrast, it may be possible to stack up to five or six of the payload adapters 24 on top of one another due to the increased strength and reduced mass provided by the truss supports 50. In an embodiment, the number of payload adapter 24 stacked on top of one another may be limited by the available volume within an interior 98 of the payload fairing 20, and not by the strength of the payload adapters 24 themselves.

In an alternative embodiment as shown in FIG. 10, the main body 34 of the payload adapter 24 includes a monocoque structure defining the shell 86. The shell 86 carries the stress of the loads exerted upon the payload adapter 24. The shell 86 of the payload adapter 24 connects the forward ring 44 to the aft ring 48. The shell 86 defines a continuous innermost surface 88 and a continuous outermost surface 90.

In the non-limiting embodiment as shown in FIG. 10, the mounting fixtures 56 are disposed around the forward ring 44 and the aft ring 48 of the payload adapter 24. However, in the embodiment as shown in FIG. 11, the mounting fixtures 56 are disposed on the shell 86 of the monocoque structure of the payload adapter 24.

Figure 11:
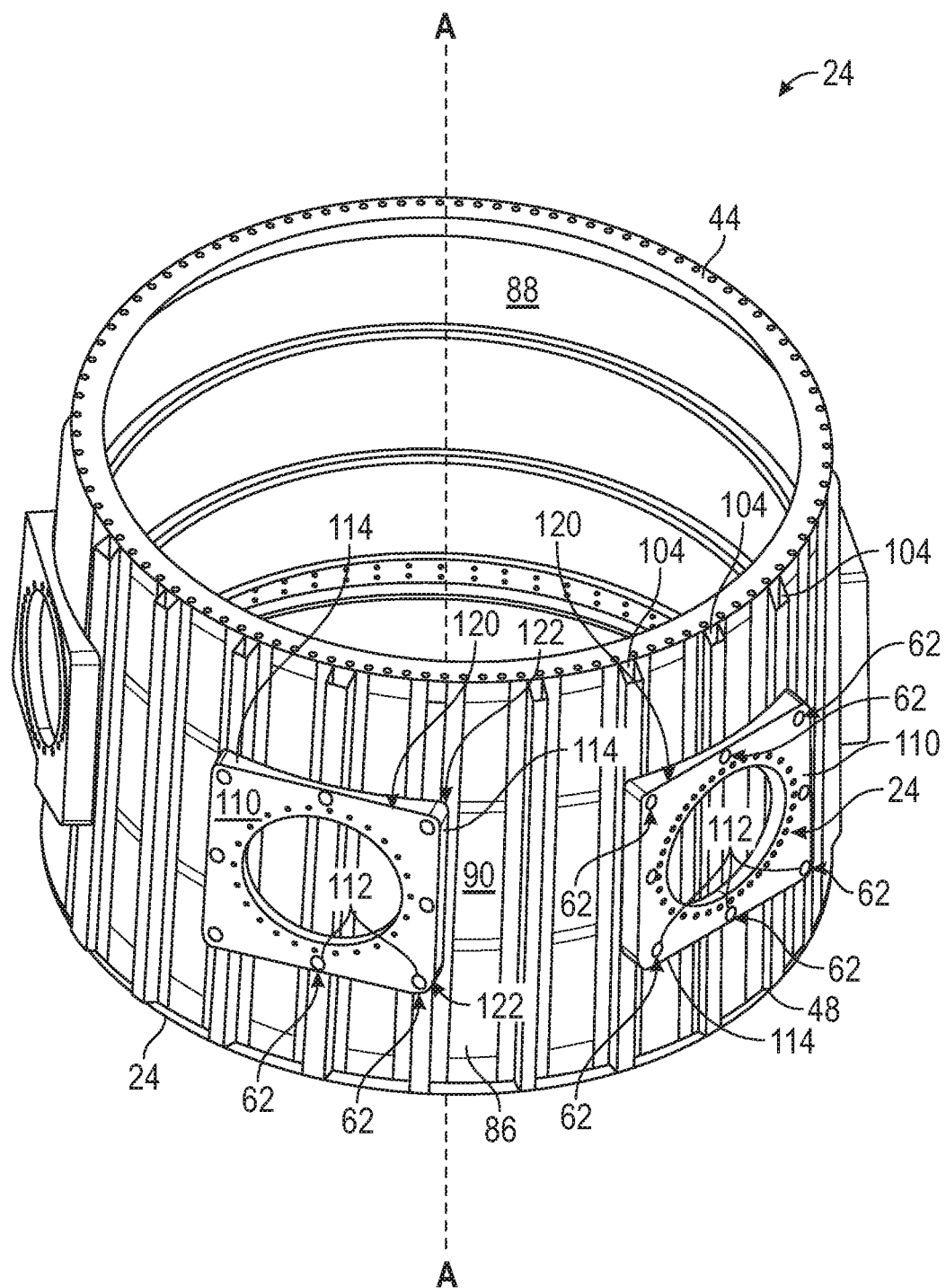
FIG. 11 is an illustration of the payload adapter having a monocoque structure, where a plurality of stringers are disposed along an outermost surface of the shell, according to an exemplary embodiment.

Referring now to FIG. 11, in another embodiment the outermost surface 90 of the shell 86 of the payload adapter 24 defines a plurality of stringers 104. In the exemplary embodiment as shown in FIG. 11, the plurality of stringers 104 extend vertically along the outermost surface 90 of the shell 86 between the forward ring 44 and the aft ring 48 of the payload adapter 24. In other words, the plurality of stringers 104 are parallel with the axis of rotation A-A of the payload adapter 24. However, in another embodiment, the plurality of stringers 104 are disposed circumferentially around the shell 86 and are perpendicular with respect to the axis of rotation A-A of the payload adapter 24. Although FIG. 11 illustrates the plurality of stringers 104 disposed along the outermost surface 90 of the shell 86, it is to be appreciated that the plurality of stringers 104 may be disposed along the innermost surface 88 of the shell 86 as well.

The stringers 104 are each shaped to receive fasteners 72 (FIG. 4), such as the shank portion of a bolt. The wall structure 110 of each secondary payload bridge 40 defines the plurality of attachment points 62. In the embodiment as shown, the plurality of attachment points 62 are apertures 112 that extend through the wall structure 110 of the corresponding secondary payload bridge 40. FIG. 11 depicts each secondary payload bridge 40 having the attachment points 62 disposed around an outer periphery 114 of the wall structure 110. Moreover, the outer periphery 114 of the secondary payload bridges 40 include a square profile 120, and an attachment point 62 is disposed at each corner 122 of the square profile 120. However, it is to be appreciated that FIG. 11 is merely exemplary in nature, and the secondary payload bridges 40 may include other profiles as well.

Figure 12:
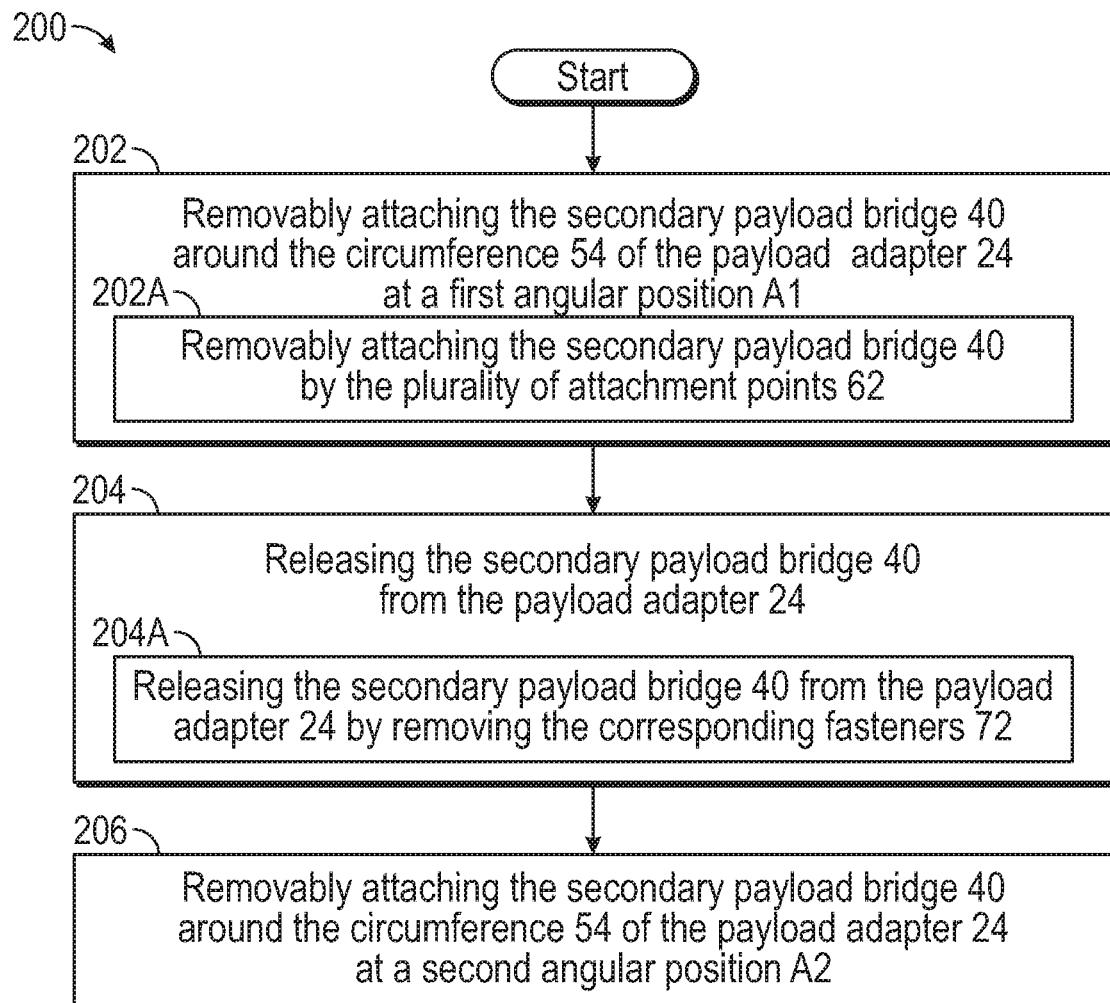
FIG. 12 is a process flow diagram illustrating an exemplary method for positioning the secondary payload bridge 40 around the circumference 54 (FIG. 4) of the payload adapter.

FIG. 12 is an exemplary process flow diagram illustrating a method 200 for positioning the secondary payload bridge 40 around the circumference 54 (FIG. 4) of the payload adapter 24. It is to be appreciated that in one embodiment, once a position of the secondary payload bridge 40 is finalized, the secondary payload bridge 40 is then permanently attached to the secondary payload bridge 40. Referring to FIGS. 1, 6A, 6B, and 12, the method 200 begins at block 202. In block 202, the secondary payload bridge 40A is removably attached to the main body 34 of the payload adapter 24 at the first angular position 1A, which is shown in FIG. 6A. As mentioned above, the secondary payload bridge 40 is removably attached to the payload adapter 24 to allow for clockable positioning around the circumference 54 of the payload adapter 24.

As seen in block 202A, the secondary payload bridge 40 is removably attached to the payload adapter 24 by the plurality of attachment points 62 connected to the body portion 74 of the secondary payload bridge 40. The method 200 may then proceed to block 204.

In block 204, the secondary payload bridge 40 is released from the payload adapter 24. For example, as seen in block 204A, in one embodiment the secondary payload bridge 40 is released from the payload adapter 24 by removing the corresponding fasteners 72 that secure the secondary payload bridge 40 to the payload adapter 24. The method 200 may then proceed to block 206.

In block 206, the secondary payload bridge 40 is removably attached to the main body 34 of the payload adapter 24 at a second angular position A2 (seen in FIG. 6B) around the circumference 54 of the payload adapter 24. Referring to both FIGS. 6A and 6B, the first angular position A1 represents a different angular position about the rotational axis A-A of the payload adapter 24 than the second angular position A2. The method 200 may then terminate.

Referring generally to the figures, the disclosed adapter ring having truss supports provides various technical effects and benefits. Specifically, the truss supports are lightweight, and therefore result in a mass efficient design that provides a low mass to strength ratio. Furthermore, it is also to be appreciated that the inverted equilateral triangle-shaped openings around a circumference of the payload adapter offer additional access to an inside volume of the payload adapter that has traditionally been challenging to reach. Finally, the adapter ring also includes a plurality of receiving features that are each configured to releasably attach to a secondary payload bridge. Thus, the position of the secondary payloads around the circumference of the payload adapter may be adjusted on an ongoing basis. The disclosed secondary payload bridges support non-standard secondary payload geometries to be secured to the payload adapter. Furthermore, the mass distribution or total mass of secondary payloads may be changed during development of each payload without needing to re-design the payload adapter as a result.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A payload adapter configured to removably attach to one or more payload bridges, the payload adapter comprising:
   a forward open end defined by a forward ring, an aft open end defined by an aft ring, and a plurality of truss supports connecting the forward ring and the aft ring to one another, wherein the payload adapter is a truss payload adapter and the plurality of truss supports are configured to bear loads exerted upon the payload adapter; and
   a plurality of mounting fixtures disposed around a circumference the payload adapter, wherein the mounting fixtures are each configured to releasably attach a secondary payload bridge, and wherein the secondary payload bridge is composed of a plurality of trusses.

2. The payload adapter of claim 1, wherein the plurality of mounting fixtures are disposed around the forward ring and the aft ring of the payload adapter.

3. The payload adapter of claim 2, wherein the payload adapter further comprises an upper ring and a lower ring that are disposed between the forward ring and the aft ring.

4. The payload adapter of claim 3, wherein the plurality of mounting fixtures are disposed around both the upper ring and the lower ring.

5. The payload adapter of claim 1, wherein the plurality of truss supports are constructed of a carbon fiber composite.

6. The payload adapter of claim 1, wherein the payload adapter has an annular profile defining a circumference.

7. The payload adapter of claim 6, wherein the plurality of mounting fixtures are disposed around the circumference of the payload adapter.

8. The payload adapter of claim 6, wherein the plurality of mounting fixtures are a plurality of bolt holes disposed around the forward ring and around the aft ring.

9. The payload adapter of claim 6, wherein the mounting fixtures are disposed around either an innermost side, an outermost side, or both the innermost side and the outermost side of the payload adapter.

10. The payload adapter of claim 1, wherein the plurality of truss supports form alternately inverted isosceles triangle-shaped openings around a circumference of the payload adapter.

11. A payload adapter, comprising:
a forward open end defined by a forward ring, an aft open end defined by an aft ring, and a plurality of truss supports connecting the forward ring and the aft ring to one another, wherein the payload adapter is a truss payload adapter and the plurality of truss supports are configured to bear loads exerted upon the payload adapter;
a plurality of mounting fixtures disposed around a circumference the payload adapter; and
a secondary payload bridge, comprising:
a body portion;
a plurality of attachment points connected to the body portion of the secondary payload bridge, wherein the plurality of mounting fixtures are each configured to releasably attach to one of the plurality of attachment points of the secondary payload bridges; and
a secondary payload port that is connected to the body portion, wherein the secondary payload port is configured to releasably attach a corresponding secondary payload, and wherein the secondary payload bridge is composed of a plurality of trusses.

12. The payload adapter of claim 11, wherein the plurality of mounting fixtures are disposed around the forward ring and the aft ring of the payload adapter.

13. The payload adapter of claim 12, wherein the payload adapter further comprises an upper ring and a lower ring that are disposed between the forward ring and the aft ring.

14. The payload adapter of claim 13, wherein the plurality of mounting fixtures are disposed around both the upper ring and the lower ring.

15. The payload adapter of claim 11, wherein the plurality of truss supports are constructed of a carbon fiber composite.

16. The payload adapter of claim 11, wherein the payload adapter has an annular profile defining a circumference.

17. The payload adapter of claim 16, wherein the plurality of mounting fixtures are disposed around the circumference of the payload adapter.

18. The payload adapter of claim 16, wherein the plurality of mounting fixtures are a plurality of bolt holes disposed around the forward ring and around the aft ring.

19. The payload adapter of claim 11, wherein the plurality of truss supports form alternately inverted isosceles triangle-shaped openings around a circumference of the payload adapter.

20. A method of constructing a payload adapter, comprising:
connecting a forward open end defined by a forward ring to an aft open end defined by an aft ring by a plurality of truss supports, wherein the payload adapter is a truss payload adapter and the plurality of truss supports are configured to bear loads exerted upon the payload adapter; and
placing a plurality of mounting fixtures around a circumference the payload adapter, wherein the plurality of mounting fixtures are each configured to releasably attach a secondary payload bridge, and wherein the secondary payload bridge is composed of a plurality of trusses.

* * * * *

UNITED STATES PATENT AND TRADEMARK OFFICE
CERTIFICATE OF CORRECTION

PATENT NO. : 11,396,389 B2
APPLICATION NO. : 16/678424
DATED : July 26, 2022
INVENTOR(S) : Bailey Keakulina Eaton, Craig Patrick McGrath and Dana M. LaFavour It is certified that error appears in the above-identified patent and that said Letters Patent is hereby corrected as shown below:

On the Title Page

The Left Column, Item (72), under "Inventors" reads:
"Craig Patrick McGarth, Seattle, WA (US);"
Should read:
--Craig Patrick McGrath, Seattle, WA (US);--

Signed and Sealed this
Twentieth Day of December, 2022

Katherine Kelly Vidal
*Director of the United States Patent and Trademark Office*